United States Patent

Harada et al.

[11] Patent Number: 5,898,064
[45] Date of Patent: Apr. 27, 1999

[54] PROCESS FOR MANUFACTURING RESIN PARTICLES HAVING NARROW PARTICLE SIZE DISTRIBUTION

[75] Inventors: Yutaka Harada, Suita; Takehiro Ojima, Habikino; Haruhiko Sato, Hirakata, all of Japan

[73] Assignee: Nippon Paint Co., Ltd., Japan

[21] Appl. No.: 08/725,676

[22] Filed: Oct. 2, 1996

[30] Foreign Application Priority Data

Oct. 3, 1995 [JP] Japan ................................ 7-279735

[51] Int. Cl.⁶ .................... C08F 2/20; C08F 6/24
[52] U.S. Cl. .................... 526/203; 526/193; 526/199; 526/200; 526/201; 526/202; 528/486; 528/487; 528/499; 528/501
[58] Field of Search .................... 526/200, 202, 526/203, 193, 199, 201; 528/486, 487, 499, 501

[56] References Cited

U.S. PATENT DOCUMENTS 5,395,880   3/1995   Sato et al. ................... 526/202

*Primary Examiner*—Fred Teskin
*Attorney, Agent, or Firm*—Millen, White, Zelano & Branigan, P.C.

[57] ABSTRACT

Thermoplastic or thermosetting resin particles having a narrow particle size distribution are produced by suspending a liquid resinous composition in an aqueous solution of an anionic or cationic polyelectrolyte as primary particles of oil droplets, adjustion the suspension at a pH at which the polyelectrolyte is insolubilized to agglomerate into secondary particles of larger particle size, and allowing the secondary particles in the suspension to solidify.

15 Claims, No Drawings

PROCESS FOR MANUFACTURING RESIN PARTICLES HAVING NARROW PARTICLE SIZE DISTRIBUTION

BACKGROUND OF THE INVENTION

This invention relates to a process for manufacturing resin particles having a narrow particle size distribution.

There are a number of reports and patent literature addressing the manufacture of micron size resin particles having a narrow particle size distribution. One of known methods for manufacturing such resin particles is the suspension polymerization method in which vinyl monomers containing an oil-soluble initiator are dispersed as oil droplets in an aqueous medium containing a stabilizer and then polymerized. However, this method gives resin particles having a wide particle distribution under normal stirring conditions. This is because polymer particles tend to adhere to reaction vessel walls or mixing propellers and the particle size distribution depends mainly upon the incidence of agglomerating and splitting of monomer droplets. In order to prevent these phenomena from happening, several methods have been proposed including the use of viscous monomer droplets in suspension polymerization by dissolving a portion of polymer in the monomer or partly polymerizing the monomer in bulk prior to the suspension polymerization. Other methods include the use of strongly surface active stabilizer or water-insoluble inorganic particles in the dispersing medium. These methods are generally effective to decrease the proportion of coarse particles because of improved mixing efficiency and decreased agglomeration but they are not effective to decrease the proportion of fine particles. Consequently, the particle size distribution represented by the ratio of weight average particle size to number average particle size can be improved only slightly by these methods.

The seed polymerization and swelling method disclosed in JP-A-58106554 can give linear or crosslinked vinyl polymer particles having a very narrow particle size distribution in which the weight average particle size nearly equals the number average particle size. Unfortunately, this method requires a number of steps for growing polymer particles making it unsuitable for a large scale industrial application. In addition, it cannot be applied to the manufacture of polymer particles including foreign matter such as pigments.

JP-A-03200976 discloses a method for manufacturing colored or pigmented polymer particles in which monomers are polymerized in a dispersion in nonaqueous systems or solvent-water mixture systems. Because a large quantity of solvent is used, this method suffers from safety and environmental problems in handling, recovering or otherwise processing used solvents.

Recently much interest has been focussed on powder coating in finishing automobile bodies and parts, household electrical apparatuses, building materials and the like for the purposes of eliminating the emission of organic solvents to the environment. Powder coating compositions are generally produced by blending a binder resin with a crosslinker and optionally other additives such as pigments, kneading the mixture under heat to make a molten mass, pulverizing the mass and then classifying pulverized particles. The resulting particles are applied on a substrate using electrostatic spray coating, fluidized bed coating or other methods to form a film, and then baking the film. However, most of the prior are powder coating compositions have certain defects. Since they tend to cause premature curing before use, chemicals or substances which react at a relatively low temperature cannot be added. Because the weight average particle size of conventional powder coating compositions normally lie at around 30 $\mu$m, they are not satisfactory in terms of smoothness, gloss and other aesthetic properties of finished films. Attempts have been made to produce finer particles having a weight average particle size of 10 $\mu$m or less by means of jet mills or other air stream mills. This approach is found effective to obtain much smoother and thinner films than the films of conventional powder coating compositions. On the other hand, this powder coating composition comprises not only a large portion of microfine particles but also particles of irregular configuration. This makes the powder less free-flowing and increases the incidence of clogging of pneumatic conveyer pipes. Furthermore, it is conventional practice to recover and reuse excessively applied powder in the powder coating technology. If the proportion of microfine particles increases in the recovered powder, not only will pneumatic transportation become more difficult but also deposition efficiency of the powder onto the substrate will be greatly impaired.

Therefore, a need exists for a process for manufacturing resin particles free from above-discussed problems.

SUMMARY OF THE INVENTION

The present invention provides a process for manufacturing resin particles having a narrow particle size distribution comprising the steps of:
(a) providing an aqueous solution of a water-soluble polymeric material which insolubilizes in a certain pH range;
(b) providing a liquid resinous composition capable of solidifying into resin particles;
(c) suspending said liquid resinous composition in said solution of said polymeric material as primary particles of oil droplets having a number average particle size of less than 10 microns;
(d) adjusting the pH of said suspension to said insolubilizing pH range to allow said primary particles to agglomerate and fuse into secondary particles having a number average particle size from 2 to 20 times greater than that of the primary particles;
(e) allowing said secondary particles in the suspension to solidify during or after step (d); and
(f) optionally recovering said solidified secondary particles from the suspension.

DESCRIPTION OF THE PREFERRED EMBODIMENTS

It is well-known that anionic or cationic polyelectrolytes are hardly soluble in water when occurring as non-ionized molecules but become soluble as the degree of electrolytic dissociation increases by neutralization. Therefore, a stable suspension of oil droplets in an aqueous solution of a neutralized polyelectrolyte becomes less stable when the pH of the suspension is adjusted to a certain range within which the polyelectrolyte becomes insoluble with the decrease in the degree of electrolytic dissociation, and the oil droplets in the suspension grow up to larger secondary particles by agglomeration and fusion. The present invention utilizes this physico-chemical phenomenon as its principle to prepare resin particles for use as powder coating compositions, electrophotographic toners, carrier resin particles of diagnostic reagents and the like.

A variety of anionic or cationic polyelectrolytes may be used in the present invention. Examples thereof includes sulfonated polyvinyl alcohol, carboxylated polyvinyl alcohol, polyacrylic acid, polymethacrylic acid, sodium polyacrylate, sodium polymethacrylate, polystyrenesulfonic acid, sodium polystyrenesulfonate, maleic acid copolymers, polyvinylphosphoric acid, carboxymethylcellulose, alginic acid, sodium alginate and other polymers having carboxylic, sulfuric or phosphoric acid group. Cationic polyelectrolytes having a quaternary ammonium base group may also be used. Mixtures of two or more polyelectrolytes having the same polarity may be used. These polyelectrolytes may be used in combination with a non-electrolytic suspension-stabilizer well-known in the art such as starch, ethylcellulose, hydroxyethylcellulose, gelatin, polyvinyl alcohol or polyvinylpyrrolidone.

The resin component from which resin particles are made according to the present invention is selected depending upon their particular application and properties required therefor. However, care should be taken to select resin components which do not undergo a chemical reaction upon the pH change of the suspension in step (d). Examples thereof include polyesters, polycarbonates, polyurethanes, (meth) acrylate ester copolymers and copolymers of styrene or other aromatic vinyl monomers.

Liquid resinous compositions having a viscosity level suitable for suspending in an aqueous suspension medium containing polyelectrolyte stabilizer are produced by dissolving the resin component in organic solvents such as xylene, toluene, cyclohexane and ethylacetate, or polymerizable monomers such as styrene-based monomers and acrylate monomers.

Polymerizable monomers themselves may be used as a droplet-making, liquid resinous composition. Usable monomers for this purpose include styrene-based monomers such as styrene, vinyltoluene, ethylstyrene or p-chlorostyrene, and acrylate monomers such as methyl acrylate, methyl methacrylate, n-butyl acrylate, n-butyl methacrylate, 2-ethylhexyl acrylate or 2-ethylhexyl methacrylate. Mixtures of these monomers may also be used. These monomers may be copolymerized with a small proportion of a cationic monomer such as N,N-dimethylaminoethyl methacrylate, N,N-diethylaminoethyl methacrylate or vinylpyridine, or an anionic monomer such as acrylic acid, methacrylic acid, fumaric acid, maleic acid or maleic anhydride when resin particles having ionizable groups are desired. A small proportion of polyfunctional monomers such as divinylbenzene, ethylene glycol dimethacrylate, trimethylolpropane triacrylate, glycidyl methacrylate or glycidyl acrylate may also be copolymerized.

Interfacially polymerizable compounds may be used as a droplet-making, liquid resinous composition. These compounds must be soluble in an organic solvent and have a plurality of reactive groups per molecule capable of reacting with a water-soluble monomeric compound to form a polymeric shell layer around the resin particles. Specific examples of interfacially polymerizable compounds include tolylenediisocyanate, 4,4-dicyclohexylmethanediisocyanate, m-tetramethylxylylenediisocyanate (m-TMXDI), trimethylhexamethylenediisocyanate (TMDI), hexamethylenediisocyanate, polyether type urethane prepolymers and other diisocyanates. Dicarboxylic acid chlorides such as sebacic, azelaic, terephthalic, isophthalic or adipic acid chloride may also be used as interfacially polymerizable compound. Examples of water-soluble monomeric compounds include 1,6-hexanediamine, 1,4-bis(3-aminopropyl)piperazine, 2-methylpiperazine or m-xylene-α, α'-diamine.

As is well-known, radical polymerization of ethylenically unsaturates monomers is carried out in the presence of a radical polymerization initiator. In the present invention, an oil-soluble peroxide or azo initiator such as benzoyl peroxide, lauroyl peroxide, 2,2'-azobisisobutyronitrile or 2,2'-azobis((2,4-dimethylvaloronitrile) is incorporated into droplet-forming monomer mixture and the polymerization of monomers are allowed to proceed during or after the pH adjustment step (d). The amount of polymerization initiator ranges from 0.1 to 10%, preferably from 0.5 to 5% by weight of monomers.

Interfacial polymerization is conducted by adding the water-soluble monomeric compound to the suspension of liquid resinous composition after the pH adjustment step (d).

The liquid resinous composition may contain a variety of conventional additives depending upon intended use of final resin particles. For use as toners of recording media, the liquid resin composition may contain a coloring pigment such as phthalocyanine copper, quinacridon, diazoyellow or carbon black. Preferably, from 0.5 to 150 parts by weight of the coloring pigment may be incorporated per 100 parts by weight of the resin component. For use as toners, magnetic particles are also added to the resinous composition. In addition to these additives, the resinous composition preferably contain an electrostatic charge-controlling agent such as boron complex, gold-containing dyes or quaternary ammonium salts. Preferably, from 0.1 to 5 parts by weight of the charge-controlling agent are added per 100 parts of by weight of the resin component. The resinous component may further contain a wax such as polypropylene wax or polyethylene wax in order to impart resin particles with releasability.

The resin component from which particles are made according to this invention may be a thermosetting resin which is thermerlly curable and also soluble or swellable in conventional organic solvents. Such resins are well-known in the art and their selection is to be made depending upon the intended use of resin particles and properties required therefor. Examples thereof includes polyesters, (meth) acrylate ester copolymers, aromatic vinyl compound copolymers, epoxy resins, phenol resins, melamine-formaldehyde resins, urea-formaldehyde resins and other thermosetting resins. Resins which are not thermosetting themselves, such as polyester resins, (meth)acrylate ester copolymers or aromatic vinyl compound copolymers are combined with an external crosslinker. Polymers not soluble in a conventional solvent such as polyethylene or polypropylene may be incorporated into the resin particles by dispersing in a solvent-soluble resin component.

Any organic solvent which is substantially immiscible with water, namely having a solubility in water of less than 10%, and has a boiling point of lower than 100° C. or is capable of forming an azeotropic mixture with water may be used in this invention. This is because the resin solution should be capable of forming oil droplets in water.

For use in powder coating application, the resin component preferably consists of an epoxy, acrylic or polyester resin in combination with an appropriate crosslinker thereof. Examples of crosslinkers include, as is well-known in the art, polycarboxylic anhydrides, dicyandiamide or acrylic resins for epoxy resins; polycarboxylic acids, epoxy resins or melamine resins for acrylic resins; and polycarboxylic acids and anhydrides, epoxy compounds, melamine resins or blocked polyisocyanates for polyester resins.

Particles for powder coating use may optionally contain various pigments such as titanium dioxide, ferric oxides yellow iron oxide, carbon black, phthalocyanine blue or quinacridon red; surface conditioners such as polysiloxane or acrylic resins; plasticizers; UV absorbers; anti-pinhole agents; antioxidants; pigment dispersants; catalysts such as amines, imidazoles or cation polymerization initiators; and other resins. These additives may be dissolved or dispersed in the resin solution to make the liquid resinous composition.

According to this invention, the water-soluble polymer electrolyte, namely polyelectrolyte is dissolved in water optionally in combination with a conventional suspension stabilizer at a pH at which the polyelectrolyte is soluble. When necessary, an acid or base is used to neutralize the polyelectrolyte. The neutralizing acid or base used for this purpose should not have an adverse effect on the resin component and includes hydrochloric or acetic acid for cationic polyelectrolytes and sodium hydroxide or aqueous ammonia for anionic polyelectrolytes. The total concentration of the polyelectrolyte plus conventional stabilizer in the suspension medium may vary with the nature of particular polyelectrolyte or stabilizer and generally ranges from 0.02 to 20% by weight.

The liquid resinous composition is then suspended as oil droplets in the aqueous solution containing the polyelectrolyte. Mixing of these two components may be accomplished by means of a homogenizer when their viscosities are relatively low. When their viscosities are relatively high, mixing may be accomplished by means of a universal mixer or a planetary mixer. The initial particle size of oil droplets present in the suspension may vary depending upon the intended application and is preferably less than 10 microns. The suspension is adjusted to a final resinous composition concentration of from 10 to 50% by weight by diluting, where necessary, with deionized water.

In the next step, the pH of the suspension is adjusted to a value at which the polyelectrolyte is insolubilized. The pH adjustment may be accomplished using an acid for anionic polyelectrolytes or a base for cationic polyelectrolytes. Not all molecules of the polyelectrolyte need be insolubilized but a portion thereof may remain ionically dissociated. When the polyelectrolyte present in the suspension is insolubilized at least partly, the suspension becomes less stable. As a consequence the total surface area of dispersed phase decreases and finer particles tend to agglomerate with each other into larger secondary particles having a number average particle size of 2 to 20 times greater than that of primary particles to accomodate the decrease in the total surface area of dispersed phase. Since finer particles have larger specific surface area than coarse particles, they will preferentially agglomerate into larger secondary particles. This contributes to a narrow particle size distribution of secondary particles even when starting from primary particles having wider particle size distributions.

During or after the agglomeration of primary particles into larger secondary particles, the liquid resinous composition present in the suspension as oil droplets is allowed to solidfy. This may be accomplished by either heating the suspension for a sufficient time to complete the polymerization of monomers contained in the resinous composition or removing the organic solvent contained in the liquid resinous composition by means of distillation under reduced pressure or azeotropic distillation with water. This enables encapsulation of a thermally sensitive substance in the resin particles. This represents one of significant advantages of the present invention.

The final resin particles thus obtained generally have a ratio of weight average particle size to number average particle size of less than 2. When the final resin particles are used as toners for electrophotography or powder coating compositions, they may be recovered from the suspension by any conventional method such as filtration or centrifugation, and then dried.

In addition to a narrow particle size distribution, the present invention can achieve other significant advantages. For example, the present invention enables the melting point and/or pigment dispersibility of the final particles to be easily adjustable. It also enables modifying the surfaces of particles to have various functional groups as well as microcapsulation of various substances.

For powder coating application, since the resin particles produced by the present invention not only have a predetermined particle size but also consist mainly of spherical particles with lesser proportions of microfine and irregular shape particles than particles produced by the prior art methods, they are free-flowing and produce a thin coating film having excellent appearance properties. In addition, a high deposit efficiency is achieved using the resin particles produced by the present invention in the powder coating technology. This is because the resin particles are virtually free from microfine particles which are easily blown off in the air upon application and the recovered resin particles still retain virtually the same particle size distribution before use.

EXAMPLES

The following examples are given for illustrative purposes only but are not limiting. All parts and percents therein are by weight unless otherwise specified Production Example 1

Resin Solution A

A reactor equipped with a stirrer, condenser, thermometer and nitrogen gas tube was charged with 63 parts of xylene and heated to 130° C. To this was added the following monomer mixture over 3 hours under nitrogen gas atmosphere.

| Material | Parts |
| --- | --- |
| Glycidyl methacrylate | 40 |
| Styrene | 25 |
| Methyl methacrylate | 25 |
| Isobutyl methacrylate | 10 |
| t-Butyl peroctoate | 3 |

Thereafter the mixture was maintained at the same temperature for 30 minutes. After adding 1 part of t-butyl peroctoate over 30 minutes, the mixture was maintained at the same temperature for 1 hour and then cooled to room temperature.

Production Example 2

Resin Solution B

A reactor equipped with a stirrer, condenser and thermometer was charged with the following materials.

| Material | Parts |
| --- | --- |
| Isophthalic acid | 35 |
| Phthalic anhydride | 31 |

| Material | Parts |
| --- | --- |
| Neopentyl glycol | 41 |
| 1,6-Hexanediol | 5 |
| Dibutyltin oxide | 0.06 |

The mixture was heated to 240° C. over 3 hours while removing water. The condensation reaction was then continuted until an acid number of 5 was reached. After the reaction, the product was cooled to 100° C. and dissolved in 100 parts of xylene.

Example 1

A thermosetting resin composition was produced by mixing the following materials in a sand grind mill.

| Material | Parts |
| --- | --- |
| Resin solution A (acrylic) | 80 |
| Curing agent (1,10-decanedicarboxylic acid sold by Ube Industries, Ltd.) | 18 |
| Polysiloxane surface conditioner (YF-3919 sold by Toshiba Silicone Co., LTd) | 1 |
| Benzoin | 1 |
| Total | 100.00 |

Separately, an aqueous solution was prepared by dissolving 15 parts of sulfonated polyvinyl alcohol in 250 parts of deionized water.

The above resin composition and the aqueous solution were mixed in a homogenizer at $10^4$ r.p.m. to make a suspension. The particle sizes of suspended droplets were determined using a Coulter counter. The weight average particle size was 5.1 $\mu$m and the number average particle size was 2.3 $\mu$m.

The suspension was then diluted with 135 parts of deionized water and placed in a container equipped with a stirrer, temperature control means, reflux condenser and pressure reducing means. The suspension had a pH of 6 at this stage. After adjusting the pH to 3 with 0.1 N hydrochloric acid, the suspension was distilled at 30° C. under a reduced pressure of 25 Torr until the solvent in the dispersed phase was completely removed and cooled to room temperature. The resin particles thus produced were recovered by centrifugation, dried, unblocked and tested for their particle size using a Coulter counter. The weight average particle size was 12 $\mu$m and the number average particle size was 8.6 $\mu$m. Thus, the particle size distribution represented by their ratio was 14.

Example 2

Example 1 was followed except that the aqueous water-soluble polymer solution was replaced with a solution of 10 parts of GOHSENOL GH-20 (polyvinyl alcohol having a degree of saponification of 88% sold by The Nippon Synthetic Chemical Industry Co., Ltd.) and 0.6 parts of sodium polystyrenesulfonate in 250 parts of deionized water. The resulting resin particles possessed a weight average particle size of 14.0 $\mu$m and a number average particle size of 7.8 $\mu$m. The ratio of weight/number average particle size was 1.8.

Example 3

A thermosetting resin composition was produced by mixing the following materials in a sand grind mill.

| Material | Parts |
| --- | --- |
| Resin solution B (polyester) | 80 |
| Epoxy resin (EPOTOHTO YD-014 sold by Toto Kasei K.K.) | 5 |
| Methyl isobutyl ketone | 10 |
| Curing agent (blocked polyisocyanate) | 10 |
| Benzoin | 0.3 |
| Polysiloxane surface conditioner | 0.1 |
| Titanium dioxide | 20 |
| Total | 125.4 |

Separately, a water-soluble polymer solution was produced by dissolving 15 parts of GOHSENOL KL-05 (polyvinyl alcohol having a degree of saponification of 80% sold by The Nippon Synthetic Chemical Industry Co., Ltd.) and 0.3 parts sodium polyacrylate in 250 parts of deionized water.

The above resin composition and the aqueous solution were mixed in a planetary mixer at $10^4$ r.p.m. to obtain a suspension of oil droplets having a weight average particle size of 4.4 $\mu$m and a number average particle size of 2.2 $\mu$m.

The suspension having a pH of 8 was then diluted with 750 parts of deionized water and then placed in the same container as used in the preceding Examples. After distilling off about 80% of the solvent from the dispersed phase at 40° C. under a reduced pressure of 20 Torr and adjusting the pH at 4 with 0.1 N HCl, the remaining solvent was completely removed by distilling the suspension at 60° C. under a reduced pressure of 160 Torr. After cooling, the suspension was centrifuged and the separated particles were dried and unblocked. The particles were found to possess a weight average particle size of 9.8 $\mu$m and a number average particle size of 7.3 $\mu$m, exhibiting a sharp particle size distribution curve represented by a weight/number average particle size ratio of 1.3.

Comparative Example 1

Example 1 was followed except that the pH adjustment of the suspension was dispensed with. The powder coating composition thus produced was found to posses a weight average particle size of 5.5 $\mu$m and a number average particle size of 2.5. Most of particles were of sizes of oil droplets initially formed as primary particles.

Comparative Example 2

Example 3 was followed except that both the addition of sodium polyacrylate to the aqueous solution and the pH adjustment of the suspension were dispensed with. The powder coating composition thus produced was found to possess a weight average particle size of 4.8 $\mu$m and a number average particle size of 2.4 $\mu$m. Most of particles were of sizes of oil droplets initially formed as primary particles.

Testing of Powder Coating Composition

The powder coating compositions produced in Examples 1–3 and Comparative Examples 1–2 were tested for their performance. Each composition was applied electrostatically on a steel plate and baked at 160° C. for 30 minutes to produce a cured film of 50 $\mu$m film thickness. The appearance was evaluated in terms of NSIC (%) measured by a reflected image distinctiveness meter (Suga Testing Instrument Co., Ltd.).

Applicator systems used in the powder coating technology normally comprise a powder feeder (fluidized bed), injector, conveying hose and spray gun. Workability of powders of Examples and Comparative Examples was evaluated by operating the above applicator for 1 hour continuously with each powder, and judged based on the volume of powder accumlated in the injector and the hose according to the following schedule.

Very good: Not accumulated at all.

Good: Not substantially accumulated.

Bad: Injector or hose was clogged.

The test results are shown in Table 1.

TABLE 1

| | Evaluation of powder coating compositions | | | | |
|---|---|---|---|---|---|
| | Examples | | | Comparative Ex. | |
| | 1 | 2 | 3 | 1 | 2 |
| Weight average particle size, $\mu$m | 12.0 | 14.0 | 9.8 | 5.5 | 4.8 |
| Number average particle size, $\mu$m | 8.6 | 7.8 | 7.3 | 2.5 | 2.4 |
| Appearance, NSIC in % | 80 | 74 | 84 | 61 | 55 |
| Workability | Very Good | Very Good | Good | Bad | Bad |

Example 4

A thermoplastic resin composition was produced by mixing the following materials in a sand grind mill.

| Material | Parts |
|---|---|
| Resin solution B (polyester) | 160 |
| Carbon black (PRINTEX 150 T sold by DEGUSSA AG) | 7 |
| Charge controlling agent (SPIRON BLACK TRH sold by Hodogaya Chemical Co., Ltd.) | 3 |
| Polypropylene wax (VISCOL 550 P sold by Sanyo Chemical Industries, Ltd.) | 10 |
| Total | 180 |

Separately, an aqueous solution was prepared by dissolving 15 parts of GOHSENOL KL-05 and 0.3 parts of polyacrylic acid in 250 parts of deionized water and then adjusting the pH at 9 with 0.1 N NaOH.

The above resin composition and the aqueous solution were mixed in a homogenizer at $10^4$ r.p.m. to make a suspension of oil droplets having a weight average particle size of 3.5 $\mu$m and a number average particle size of 16 $\mu$m.

The suspension was then diluted with 750 parts of deionized water and placed in a container equipped with a stirrer, temperature controlling means, reflux condenser and pressure reducing means. The pH of the suspension was 9 at this stage. After removing 80% of the solvent contained in the dispersed phase by distillation at 30° C. under a reduced pressure of 25 Torr, the suspension was adjusted at a pH of 4 with 0.1 N HCl and then distilled at 30° C. at 25 Torr to remove the remaining solvent completely. After cooling, the suspension was centrifuged and the separated particles were dried and unblocked to obtain a black toner composition. The resin particles possessed a weight average particle size of 7.6 $\mu$m, a number average particle size of 4.5 $\mu$m and a ratio of weight/number average particle size of 1.7 suitable for use as toner as such without classfying. 100 parts of the resin particles were blended with 0.3 parts of fluidity-increasing silica powder (AEROSIL R-972 sold by Nippon Aerosil Co., Ltd.) and thereafter with an amount of silicone-coated ferrite carrier. The blend was used in an electrostatic copying machine (U-Bix 3142 sold by Konica Corporation) for evaluation. A clear copy free from offset and fog in the image was obtained. The fixing property was satisfactory.

Example 5

Example 4 was repeated except that carboxymethyl cellulose (CMC) was replaced for polyacrylic acid. The resulting resin particles were found to possess a weight average particle size of 7.4 $\mu$m, a number average particle size of 4.9 and a weight/number average particle size ratio of 1.5. Evaluation of the resin particles as toner was conducted as before and satisfactory results were obtained in terms of offset and fog in the image as well as in fixing property.

Example 6

A thermoplastic resin composition was produced by mixing the following materilas in a sand grind mill.

| Material | Parts |
|---|---|
| Styrene-n-butyl acrylate copolymer (HIMER SBM-73F sold by Sanyo Chemical Industries, Ltd.) | 400 |
| Styrene monomer | 420 |
| n-Butyl acrylate | 175 |
| Ethylene glycol dimethacrylate | 5 |
| 2,2'-Azobisisobutyronitrile | 30 |
| Carbon black (PRINTEX 150T) | 80 |
| Charge controlling agent (SPIRONBLACK TRH) | 10 |
| Polypropylene wax (VISCOL 660P) | 180 |
| Total | 1300 |

Separately, an aqueous solution was produced by dissolving 120 parts of GOHSENOL GH-20 and 15 parts of sodium polyacrylate in 1350 parts of deionized water.

The above resinous composition and the aqueous solution were mixed in a planetary mixer to obtain a suspension of oil droplets having a weight average particle size of 3.9 $\mu$m and a number average particle size of 1.7 $\mu$m.

The suspension was then diluted with 3,000 parts of deionized water and placed in the same container as used in the preceding Examples. The pH was 8 at this stage. After adjusting pH at 3 with 0.1 N HCl, the suspension was heated to 80° C. at a rate of 1° C./minutes and maintained at 80° C. for 3 hours to complete the polymerization of the resin component.

After cooling, the suspension was centrifuged and the separated particles were dried and unblocked to obtain a black toner composition. The resin particles were found to possess a weight average particle size of 8.2 $\mu$m, a number average particle size of 43 $\mu$m and a weight/number particle size ratio of 1.9 suitable for use as toner as such without classifying. Evaluation of the resin particles as toner was conducted as before and satisfactory results were obtained in terms of offset and fog in the image as well as in fixing property.

Example 7

A thermoplastic resin solution was produced by dissolving 65 parts of styrene-n-butyl methacrylate copolymer (HIMER SBM-73F) in 35 parts of xylene.

Separately, an aqueous solution was prepared by dissolving 10 parts of GOHSENOL GH-20 and 0.3 parts of sodium polyacrylate in 250 parts of deionized water.

The above resin solution and the aqueous solution were mixed in a homogenizer at $10^4$ r.p.m. to make a suspension of oil droplets having a weight average particle size of 3.6 μm and a number average particle size of 1.5 μm.

The suspension was then diluted with 150 parts of deionized water and placed to the same container as used in the preceding Examples. The pH was 8 at this stage. After removing 80% of the solvent completely at 40° C. at 40 Torr, the sespension was adjusted at a pH of 4 with 0.1 HCl and then distilled at 40° C. at 40 Torr to remove the remaining solvent. After cooling, the suspension was centrifuged and the separated particles were dried and unblocked to obtain resin particles having a weight average particle size of 5.3 μm, a number particle size of 3.8 μm and a weight/number average particle size ratio of 1.4.

Comparative Example 3

Example 4 was repeated except that both the addition of polyacrylic acid to the aqueous solution and the pH adjustment of suspension were dispensed with. The resulting black toner particles possessed a weight average particle size of 3.9 μm and a number average particle size of 1.8 μm. Most of particles were of sizes of oil droplets initially formed as primary particles.

We claim:

1. A process for manufacturing resin particles having a narrow particle size distribution comprising:
   (a) providing an aqueous solution of a water-soluble polymeric material which is an anionic or cationic polyelectrolyte and insolubilized in a certain pH range;
   (b) providing a liquid resinous composition;
   (c) suspending said liquid resinous composition in said solution of said polymeric material as primary particles of oil droplets having a number average particle size of less than 10 microns;
   (d) adjusting the pH of said suspension to said insolubilizing pH range to allow said primary particles to agglomerate and fuse into secondary particles having a number average particle size from 2 to 20 times greater than that of the primary particles; and
   (e) allowing said secondary particles in the suspension to solidify during or after (d).

2. The process according to claim 1 wherein (d) comprises adjusting said suspension at a pH at which at least part of said polyelectrolyte molecules are not electrolytically dissociated.

3. The process according to claim 1 further comprising recovering said secondary particles from the suspension.

4. The process according to claim 1 wherein said liquid resinous composition comprises a radically polymerizable monomer, and wherein (e) comprises polymerizing said monomer in situ.

5. The process according to claim 1 wherein said liquid resinous composition contains an organic solvent, and wherein (e) comprises distilling off said organic solvent from said secondary particles of said oil droplets.

6. The process according to claim 5 wherein said liquid resinous composition comprises a binder resin and a crosslinker.

7. The process according to claim 6 wherein said binder resin is an epoxy, acrylic or polyester resin.

8. The process according to claim 2 wherein said aqueous solution comprises said polyelectrolyte and a water-soluble non-electrolytic polymer as suspension stabilizer.

9. The process according to claim 8 wherein said polyelectrolyte is sulfonated polyvinyl alcohol, carboxylated polyvinyl alcohol, polyacrylic acid, polymethacrylic acid, polystyrenesulfonic acid, maleic acid copolymer, polyvinyl phosphoric acid, carboxymethylcellulose, alginic acid or a polymer having a quaternary ammonium base group.

10. The process according to claim 8 wherein said non-electrolytic polymer is starch, gelatin, ethylcellulose, hydroxyethylcellulose, polyvinyl alcohol or polyvinylpyrrolidone.

11. A process for manufacturing resin particles having a narrow size distribution comprising adjusting the pH of a suspension of primary particles of oil droplets of a number average particle size of less than 10 microns, of a liquid resinous composition in an aqueous solution of a water soluble anionic or cationic polyelectrolytic polymeric material to a range at which the aqueous solution of polymeric material is insoluble, whereby said oil droplets fuse into secondary particles having a number average particle size 2 to 20 times greater than said primary particles.

12. A process according to claim 11, wherein the liquid resinous composition comprises a polyester, polycarbonate, polyurethane, (meth)acrylate ester copolymer or a copolymer of an aromatic vinyl monomer.

13. A process according to claim 11, wherein the liquid resinous composition comprises a styrene or acrylate monomer.

14. A process according to claim 11, wherein the polyelectrolytic polymeric material is sulfonated polyvinyl alcohol, carboxylated polyvinyl alcohol, polyacrylic acid, polymethacrylic acid, polystyrenesufonic acid, maleic acid copolymer, polyvinyl phosphoric acid, carboxethylcellulose, alginic acid or a polymer having a quaternary ammonium base group.

15. A process according to claim 11, wherein the polyelectrolytic polymeric material is starch, gelatin, ethycellulose, hydroxyethylcellulose, polyvinyl alcohol or polyvinylprrolidone.

* * * * *